No. 889,538. PATENTED JUNE 2, 1908.
C. J. MILLER.
STORE SERVICE APPARATUS.
APPLICATION FILED MAY 22, 1905.

2 SHEETS—SHEET 1.

WITNESSES
F. O. Tanner.
C. McNamara

INVENTOR
CHARLES J. MILLER
BY
Paul & Paul
HIS ATTORNEYS.

No. 889,538. PATENTED JUNE 2, 1908.
C. J. MILLER.
STORE SERVICE APPARATUS.
APPLICATION FILED MAY 22, 1905.

2 SHEETS—SHEET 2.

WITNESSES
F. C. Tanner.
C. Macnamara

INVENTOR
CHARLES J. MILLER
BY Paul & Paul
HIS ATTORNEYS.

UNITED STATES PATENT OFFICE.

CHARLES J. MILLER, OF MINNEAPOLIS, MINNESOTA.

STORE-SERVICE APPARATUS.

No. 889,538.  Specification of Letters Patent.  Patented June 2, 1908.

Application filed May 22, 1905. Serial No. 261,525.

*To all whom it may concern:*

Be it known that I, CHARLES J. MILLER, of Minneapolis, Hennepin county, Minnesota, have invented certain new and useful Improvements in Store-Service Apparatus, of which the following is a specification.

My invention relates to store service apparatus and particularly to package carriers, and the object of the invention is to provide a receptacle that is detachable from the carrier and wherein articles of a bulky nature can be placed for transportation from one station to another.

The invention consists generally in providing a carrier and a receptacle fitting therein and provided with means to prevent the accidental disengagement of the receptacle from the carrier, but permitting it to be readily removed at either end.

Figure 1:
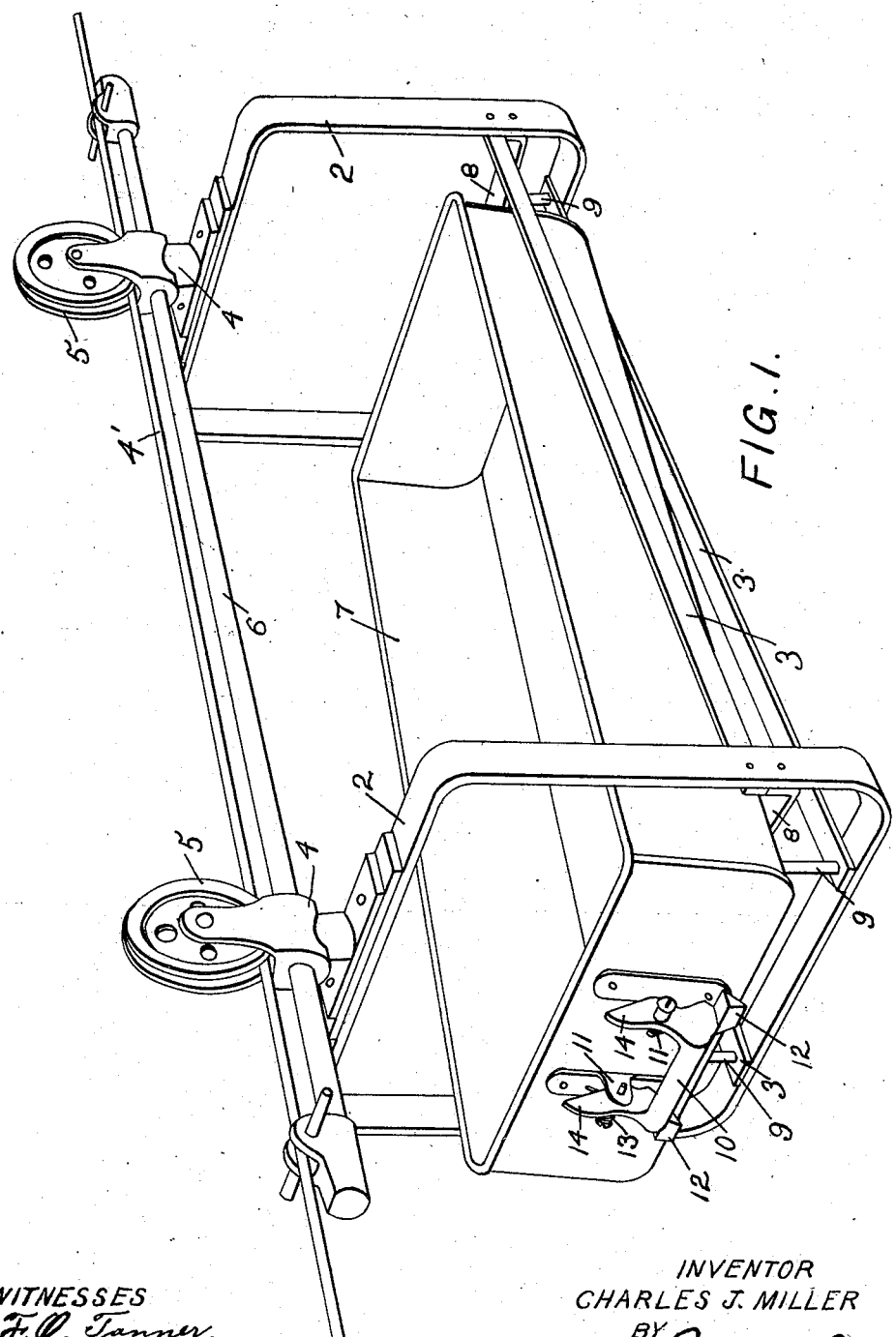
Figure 2:
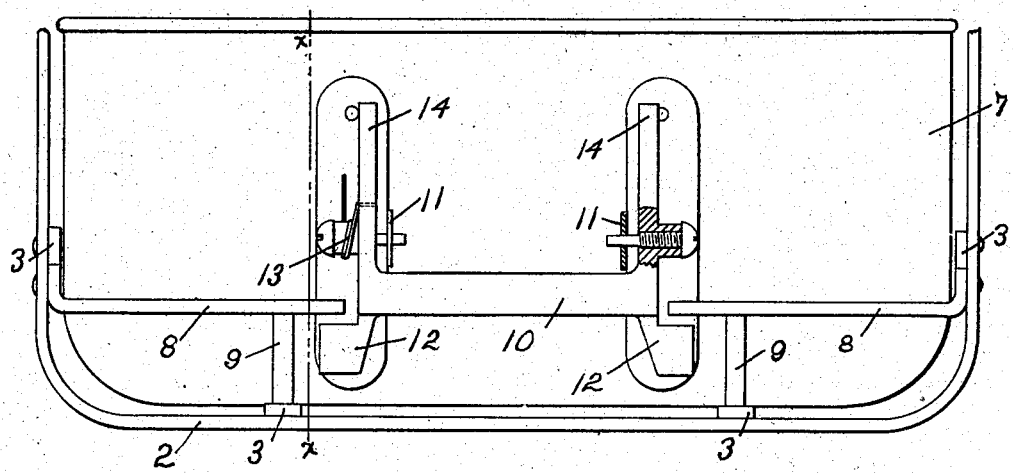
Figure 3:
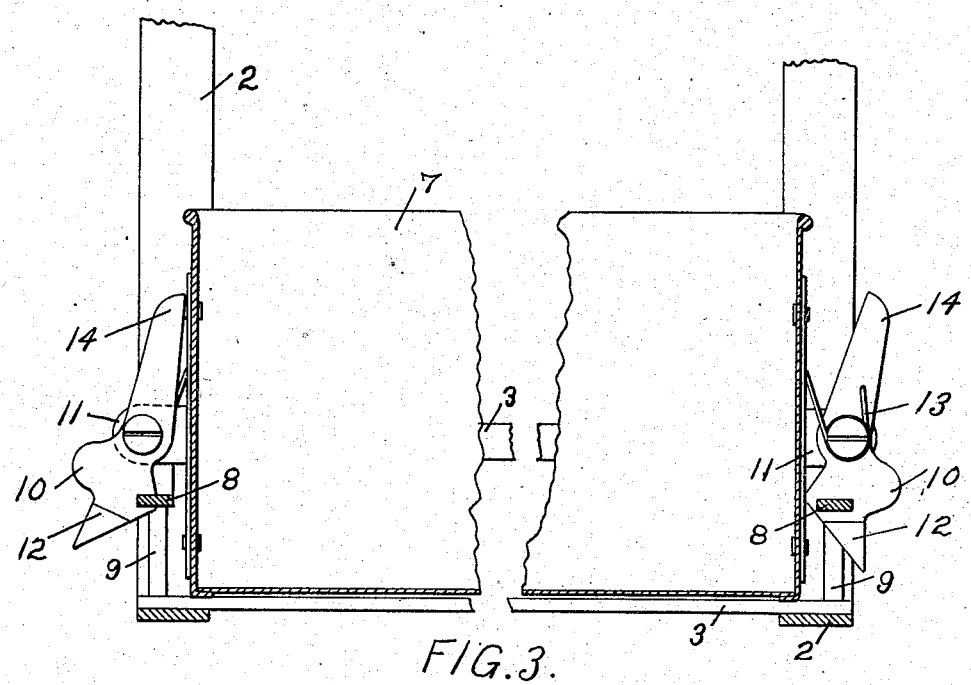

In the accompanying drawings forming part of this specification, Figure 1 is a perspective view of a package carrier embodying my invention. Fig. 2 is an end view of the same, the locking device being shown partially in section. Fig. 3 is a longitudinal section on the line $x$—$x$ of Fig. 2 illustrating the position of the locking devices at each end of the receptacle.

In the drawing, 2 represents the ends of the carrier connected by side and bottom bars 3 and provided with brackets 4 and supported upon a way 4' by carrying wheels 5 connected by a rod 6. The ends 2 are open as shown, to allow the insertion of the shallow pan 7 into the carrier, or its removal therefrom. Bars 8 are provided on said ends upon each side of the middle of the carrier and supported at their inner ends on posts 9. The pan 7 fits into the carrier between these bars. The inner ends of the bars 8 are spaced from one another, and upon each end of the pan 7 I provide handles 10 pivoted on ears 11 and provided with lugs 12 that are adapted to slip under the ends of the bars 8 and prevent accidental vertical movement of said pan. Springs 13 are provided for each of said handles to normally hold the lugs 12 against the ends of the pan in position to engage the bars 8. On the opposite side of their pivots from the lugs 12 the handles 10 are provided with arms 14 that engage the walls of the pan and limit the outward swinging movement of said handles, allowing sufficient travel, however, for the lugs 12 to clear the bars 8 and permit the end of the pan to be lifted. The pan can be removed from either end, and when one handle is tilted to release one end and the pan is drawn toward that end the opposite handle will slide between the bars 8 without contacting therewith and allow the removal of the pan from the carrier. I am thus able to securely lock each end of the pan against accidental vertical movement and disengage it from the carrier at either end.

I claim as my invention:

1. A package carrier comprising depending ends and a support connecting said ends and wheels adapted to rest and travel upon the line wire or way, a tray or pan loosely resting upon said support and adapted to receive and transport articles of a bulky nature, said pan being removable from said support at each end of the carrier, and a locking device provided at each end of said pan.

2. A package carrier comprising a support having wheels adapted to rest and travel upon the way, a package receptacle carried by said support and removable at each end thereof, and locking devices provided at each end of said receptacle, said devices automatically locking each end of said receptacle against accidental vertical movement, but allowing the removal of the receptacle at either end of the support when the locking device at that end is released, substantially as described.

3. A package carrier comprising a support having wheels adapted to rest and travel upon the way, a package receptacle carried by said support, pivoted handles provided on each end of said receptacle and normally engaging stops on said support to limit the vertical movement of said receptacle, and the handle at each end of said receptacle becoming released and allowing the withdrawal of the receptacle from its support upon the releasing of the handle at one end of said support and the movement of the receptacle toward that end, substantially as described.

4. A package carrier comprising a frame having wheels adapted to rest and travel upon the way and having bars upon each side of the middle of said frame and raised above the bottom thereof, there being an unobstructed space between the inner ends of said bars, a pan fitting within said frame, and handles pivoted on the ends of said pan and adapted to pass through the unobstructed space between said bars when said pan is moved lengthwise, and said handles having laterally extending lugs that project under said bars and limit vertical movement of said pan.

5. In a store service apparatus, the combination, with a carrier, of a package receptacle fitting therein and removable at either end, and locking devices arranged to prevent premature movement of said receptacle, said locking devices allowing removal of said receptacle by releasing the locking device at either end and moving the receptacle toward that end.

6. In a store service apparatus, the combination, with a carrier, of a package receptacle removably fitting therein, locking devices provided on each end of said receptacle and arranged to prevent accidental vertical movement of said pan, but allowing the pan to be removed at either end of the carrier when the locking device at that end is released, substantially as described.

7. A package carrier comprising a support having a bottom and wheels adapted to rest and travel upon the line wire, a tray or pan removably arranged on said bottom and adapted to receive and transport articles of a bulky nature, and means for locking said tray on said support.

8. A package carrier comprising a support having wheels adapted to rest and travel upon a line wire, a frame supported by said wheels and having open ends, a parcel receptacle removably arranged within said frame and a temporary locking device.

In witness whereof, I have hereunto set my hand this 16th day of May, 1905.

CHARLES J. MILLER.

Witnesses:
   RICHARD PAUL,
   C. MACNAMARA.